(12) United States Patent
Jussila et al.

(10) Patent No.: US 10,686,315 B2
(45) Date of Patent: Jun. 16, 2020

(54) METHOD FOR OPERATING INVERTER AND INVERTER

(71) Applicant: ABB Schweiz AG, Baden (CH)

(72) Inventors: Matti T. Jussila, Helsinki (FI); Tomi Riipinen, Järvenpää (FI); Jesse Kokkonen, Klaukkala (FI)

(73) Assignee: ABB Schweiz AG, Baden (CH)

( * ) Notice: Subject to any disclaimer, the term of this patent is extended or adjusted under 35 U.S.C. 154(b) by 340 days.

(21) Appl. No.: 15/338,418

(22) Filed: Oct. 30, 2016

(65) Prior Publication Data
US 2017/0126011 A1 May 4, 2017

(30) Foreign Application Priority Data

Oct. 29, 2015 (EP) .................................. 15192103

(51) Int. Cl.
*H02J 3/38* (2006.01)
*H02M 1/42* (2007.01)
(Continued)

(52) U.S. Cl.
CPC ................ *H02J 3/385* (2013.01); *G05F 1/67* (2013.01); *H02M 1/12* (2013.01); *H02M 1/42* (2013.01); *H02M 7/42* (2013.01); *H02M 7/44* (2013.01)

(58) Field of Classification Search
CPC ............ H02J 3/385; H02M 1/42; H02M 7/44; H02M 7/42; H02M 1/12; G05F 1/67
See application file for complete search history.

(56) References Cited

U.S. PATENT DOCUMENTS

| | | | |
|---|---|---|---|
| 5,717,585 A | * | 2/1998 | Nguyen ............ H02M 7/53803 363/132 |
| 2002/0103745 A1 | | 8/2002 | Lof et al. |

(Continued)

FOREIGN PATENT DOCUMENTS

| | | |
|---|---|---|
| CN | 10119031 A | 2/2008 |
| CN | 104272547 A | 1/2015 |

OTHER PUBLICATIONS

Shyu, Harmonic distortion reduction technique for uninterruptible power supp-lied with DC voltage boost technique, 2008 13th International Power Electronics and motion control conference, Sep. 1-3, 2008 IEEE, Piscataway, NJ, pp. 643-648.

(Continued)

*Primary Examiner* — Rexford N Barnie
*Assistant Examiner* — Thai H Tran
(74) *Attorney, Agent, or Firm* — Taft Stettinius & Hollister LLP; J. Bruce Schelkopf

(57) ABSTRACT

A method for operating an inverter and an inverter configured to convert DC power supplied from a DC power source into AC power supplied to an AC network by applying maximum power point tracking, MPPT, such that a harmonic content of an AC current supplied from the inverter to the AC network is kept within a predetermined maximum level, wherein during the converting the inverter is configured to detect a need to increase the harmonic content of the AC current supplied from the inverter to the AC network beyond the predetermined maximum level, perform a check whether an increase of the harmonic content of the AC current beyond the predetermined maximum level is allowed, and, if an increase of the harmonic content of the AC current beyond the predetermined maximum level is allowed, raise the predetermined maximum level used in the converting.

16 Claims, 2 Drawing Sheets

(51) Int. Cl.
  *H02M 7/44* (2006.01)
  *H02M 1/12* (2006.01)
  *H02M 7/42* (2006.01)
  *G05F 1/67* (2006.01)

(56) References Cited

U.S. PATENT DOCUMENTS

2009/0279336 A1* 11/2009 Erdman ............ H02M 7/53875
                                                          363/131
2012/0256490 A1    10/2012 Zheng

OTHER PUBLICATIONS

European Search Report, ABB Oy, dated Apr. 15, 2016, 2 pages.
China National Intellectual Property Administration; Translation of First Office Action dated Jan. 3, 2019; Chinese Application No. 201610970466.3; 4 pgs.
China National Intellectual Property Administration; Translation of Search Report dated Dec. 25, 2018; Chinese Application No. 201610970466.3; 2 pgs.
June-Seok; Variable DC-Link Voltage Algorithm with a Wide Range of Maximum Power Point Tracking for a Two-String PY System, Energies, vol. 6, No. 1, pp. 58-77, Jan. 2013.
European Patent Office; Communication pursuant to Article 94(3) EPC dated Oct. 26, 2018; Applicant: ABB Schweiz AG; 6 pages.
Lee et al.; Variable DC-Link Voltage Algorithm with a Wide Range of Maximum Power Point Tracking for a Two-String PV System; Energies 2013; Department of Electrical and Computer Engineering, Ajou University, San 5, Woncheon-dong, Yeongtong-gu, Suwon 443-749, Kyunggi-do, Korea; Published Jan. 2, 2013; 21 pages.

* cited by examiner

METHOD FOR OPERATING INVERTER AND INVERTER

FIELD OF THE INVENTION

The invention relates to a method for operating an inverter, and to an inverter.

BACKGROUND OF THE INVENTION

An inverter is an electrical device enabling conversion of DC (direct current) power from a DC power source to AC (alternating current) power. Herein 'inverter' generally refers to an electronic device or circuitry that is able to convert direct current to alternating current. An example of the inverter is a semiconductor bridge implemented by means of controllable semiconductor switches, such as IGBTs (Insulated-gate Bipolar Transistor) or FETs (Field-Effect Transistor), which are controlled according to a modulation or control scheme used.

One example of an electric system comprising an inverter is a photovoltaic system, such as a photovoltaic power plant or generator, in which one or more photovoltaic panels supply DC power to the inverter which converts the DC power to AC power, which may further be supplied to various AC loads via an AC network, for example. Large photovoltaic power plants may comprise a plurality of parallel inverters each receiving DC power from an array of photovoltaic panels.

In such photovoltaic power generation systems, the operation point of the PV panels is preferably driven to the best possible operation point, i.e. to a point in which a maximum amount of power can be extracted from the PV panels. This kind of technique is generally called maximum power point tracking (MPPT). As an example, the most common MPPT method is a perturb & observe (P&O) method and its variations. In this method, the MPPT voltage reference of the inverter is constantly changed, and the resulting change in the generated power is determined. On the basis of the change of power and the change of the reference value, it can then be determined whether the reference value should be decreased or increased in order to increase the amount of power extracted.

The modulation method of an inverter of such photovoltaic system may be based on a compromise between losses, chosen topology, and output current quality. The output AC current quality depends not only on the modulation method and a possible network filter but also on the AC network itself. If the AC network is rigid, the quality of the output AC current can be kept adequate with fewer commutations. The quality of the output AC current fed to the AC network may be quantified by the total harmonic distortion (THD) of the AC current and/or by one or more individual harmonics of the AC current, for example. A minimum level for the quality of the output AC current fed to the AC network is typically predetermined i.e. the harmonic content of the AC current supplied from the inverter to the AC network always needs to be below a set maximum level.

A problem related to the above solution is that the operation of the inverter may be too limited and does not enable an optimum power output.

BRIEF DESCRIPTION OF THE INVENTION

The object of the invention is thus to provide a method and an apparatus for implementing the method so as to solve or at least alleviate the above problem or at least to provide an alternative solution. The object of the invention is achieved with a method, a computer program product, an inverter and an electric system that are characterized by what is stated in the independent claims. Preferred embodiments of the invention are described in the dependent claims.

The invention is based on the idea of detecting a need to increase the harmonic content of the AC current supplied from the inverter to the AC network beyond the predetermined maximum level, checking whether an increase of the harmonic content of the AC current beyond the predetermined maximum level is allowed, and, if an increase of the harmonic content of the AC current beyond the predetermined maximum level is allowed, raising the predetermined maximum level used in the operation of the inverter.

An advantage of the solution of the invention is that the operation of the inverter can be better optimized in situations where active or reactive power output needs to be increased or power output needs to be maintained in low DC voltage situations by lowering the quality of the output AC current.

BRIEF DESCRIPTION OF THE FIGURES

In the following, the invention will be described in more detail in connection with preferred embodiments and with reference to the accompanying drawings, in which.

DETAILED DESCRIPTION OF THE INVENTION

The application of the invention is not limited to any specific system, but it can be used in connection with various electric systems. Moreover, the use of the invention is not limited to systems employing any specific fundamental frequency or any specific voltage level, for example.

Figure 1:
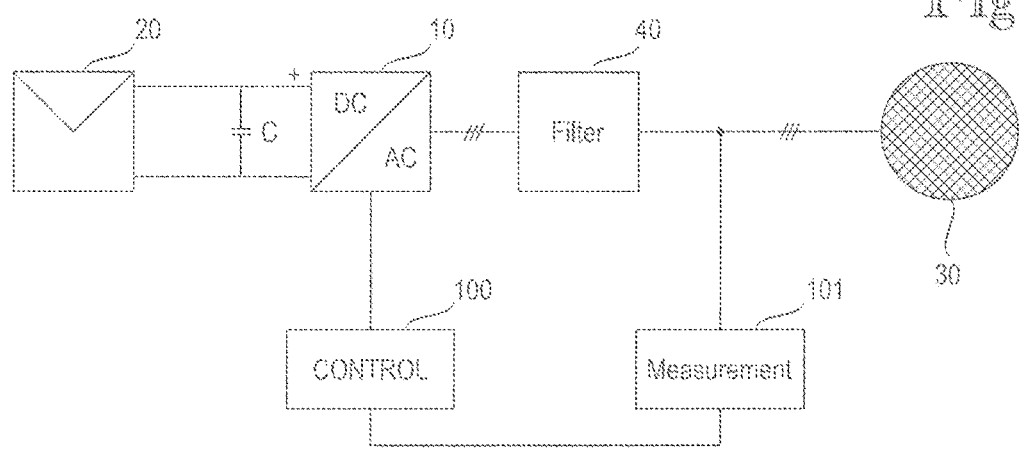
FIG. 1 illustrates an example of an electric system according to an embodiment.

FIG. 1 illustrates a simplified example of an electric system. The figure shows only components necessary for understanding the invention. The exemplary system of FIG. 1 comprises an inverter 10. A DC input of the inverter 10 may be connected to a DC power source 20 as illustrated. An example of a DC power source 20 is a photovoltaic (PV) panel or an array of two or more photovoltaic panels. Other types of DC power sources can also be utilized. There may be one or more switches (not shown) between the inverter 10 and the DC power source 20 enabling the connection and disconnection of the inverter to/from the DC power source. The exemplary system of FIG. 1 further shows a capacitance C connected between the poles of the DC input of the inverter 10. Further, an AC output of the inverter 10 may be connected to an AC network 30, such as a public electrical grid or other kind of AC network, in order to supply power from the DC power source 20 to the AC network 30, when the electric system is in normal operation. There may be one or more switches (not shown) between the electric system and the AC network 30, enabling the connection and disconnection of the electric system to/from the AC network 30. The AC connection between the inverter 10 and the AC network 30 may be a one-phase AC connection or a three-phase AC connection as illustrated, for example. The exemplary system of FIG. 1 further shows an AC output filter 40 connected to the AC output of the inverter 10. The AC output filter 40 may be an LCL-filter, for example. There could also be one or more transformers or converters (not shown in the figure) connected between the AC output of the inverter 10 and the AC network 30, for example.

The exemplary system of FIG. 1 further comprises a control arrangement for the inverter 10, which exemplary control arrangement comprises a control unit 100 and a measurement unit 101. While these exemplary units have been illustrated as separate units, they could be implemented as a single unit. Moreover, the units 100, 101 possibly included in the control arrangement for the inverter 10 could be physically included within the inverter 10 even though in the figure they have been illustrated separately from the inverter 10. The control arrangement may control the normal operation of the inverter 10 according to a modulation scheme used. Moreover, the functionality according to the various embodiments described herein may be implemented at least partly by means of the control arrangement for the inverter 10.

According to an embodiment, the inverter 10 may be operated such that DC power supplied from the DC power source 20 to the DC input of the inverter 10 is converted with the inverter into AC power supplied from the AC output of the inverter to the AC network 30 by applying maximum power point tracking, MPPT, such that a harmonic content of an AC current supplied from the inverter 10 to the AC network 30 is kept within a predetermined maximum level. The MPPT method used may be any kind of MPPT method such as the perturb & observe method. The predetermined maximum level for the harmonic content of an AC current supplied from the inverter 10 to the AC network 30 may be dependent on the AC network 30 requirements, for example. Moreover, according to an embodiment, the operation of the inverter 10 may comprise, during the converting of the DC power into AC power, the following: first a need to increase the harmonic content of the AC current supplied from the inverter to the AC network beyond the predetermined maximum level is detected. Then, in response to the detecting of the need to increase the harmonic content of the AC current beyond the predetermined maximum level, a check is performed whether an increase of the harmonic content of the AC current beyond the predetermined maximum level is allowed, and if an increase of the harmonic content of the AC current beyond the predetermined maximum level is allowed, the predetermined maximum level used in the converting is raised.

According to an embodiment, the harmonic content of the AC current supplied from the inverter 10 to the AC network 30 may be determined on the basis of total harmonic distortion (THD) of the AC current and/or one or more individual harmonics of the AC current. In the example of FIG. 1, the total harmonic distortion of the AC current and/or one or more individual harmonics of the AC current may be determined with the measuring unit 101. The measuring may take place after the possible AC output filter 40, as illustrated, or between the inverter 10 and the filter 40, for example.

According to an embodiment, the need to increase the harmonic content of the AC current may be detected on the basis of a determined MPPT voltage reference of the inverter being less than a predetermined voltage threshold value. The term "determined MPPT voltage reference" herein generally refers to a voltage reference value determined according to the MPPT method used. The predetermined threshold value for the determined MPPT voltage reference is preferably equal to or higher than a lowest DC voltage value with which nominal AC current harmonics content stays within the predetermined maximum level. As an example, the predetermined threshold value for the determined MPPT voltage reference could be determined as a peak value of the main circuit AC voltage+a predetermined voltage reserve. Alternatively or additionally, the need to increase the harmonic content of the AC current may be detected on the basis of the harmonic content of the AC current supplied from the inverter 10 to the AC network 30 being higher than a predetermined harmonic threshold level. The predetermined threshold level for the harmonic content of the AC current is preferably equal to or lower than the predetermined maximum level for the harmonic content of the AC current. Alternatively or additionally, the need to increase the harmonic content of the AC current may be detected on the basis of a temperature of the inverter 10 being higher than a predetermined temperature threshold level. The predetermined threshold level for the temperature of the inverter 10 depends on the inverter characteristics. Alternatively or additionally, the need to increase the harmonic content of the AC current may be detected on the basis of receiving in the inverter 10 a request or an allowance to increase the harmonic content of the AC current. Thus, it is also possible that the inverter 10 receives a specific request or an allowance to increase the harmonic content of the AC current and that way detects the need to increase the harmonic content of the AC current. Such a request or allowance may come from another system element or from the operator of the system, for example.

According to an embodiment, the check whether an increase of the harmonic content of the AC current beyond the predetermined maximum level is allowed may be performed by checking a value of one or more parameters stored in a memory in the inverter 10 or in a memory connected to the inverter 10. The possible memory in the inverter 10 or the possible memory connected to the inverter 10 may be any kind of memory suitable for storing at least one parameter indicating whether an increase of the harmonic content of the AC current beyond the predetermined maximum level is allowed. Such a memory may comprise e.g. a database and may contain further data and/or parameters relating to the requirements for the harmonic content of the AC current. Such a memory connected to the inverter 10 may be located remote from the inverter 10, e.g. within the AC network 30, and there may be any kind of suitable data connection, either wired or wireless, or a combination thereof, between the inverter 10 and the possible memory connected to the inverter 10. According to another embodiment, the check whether an increase of the harmonic content of the AC current beyond the predetermined maximum level is allowed may be performed by checking a value of one or more signals received by the inverter 10. Such a signal indicating whether an increase of the harmonic content of the AC current beyond the predetermined maximum level is allowed may be received by the inverter 10 continuously or periodically, for example. According to an embodiment, such one or more signals may be received in response to a query sent from the inverter 10. Such one or more signals may originate from the AC network 30, for example.

According to an embodiment, if an increase of the harmonic content of the AC current beyond the predetermined maximum level is allowed, the predetermined maximum level used in the converting may be raised to a predetermined (higher) level. Thus, there may be some predetermined level to which the predetermined maximum level of the harmonic content of the AC current used in the converting may be raised. According to another embodiment, if an increase of the harmonic content of the AC current beyond the predetermined maximum level is allowed, the predetermined maximum level used in the converting may be raised or to a level determined or obtained during or after the check whether an increase of the harmonic content of the AC current beyond the predetermined maximum level is allowed. In other words, if an increase of the harmonic content of the AC current beyond the predetermined maximum level is allowed, it is possible to determine at the same time or after the check the new higher level of the harmonic content of the AC current used in the converting. Such determination may be based on information received or obtained from the possible memory in the inverter 10 or the possible memory connected to the inverter 10, or within the possible one or more signals received by the inverter 10.

Figure 2:
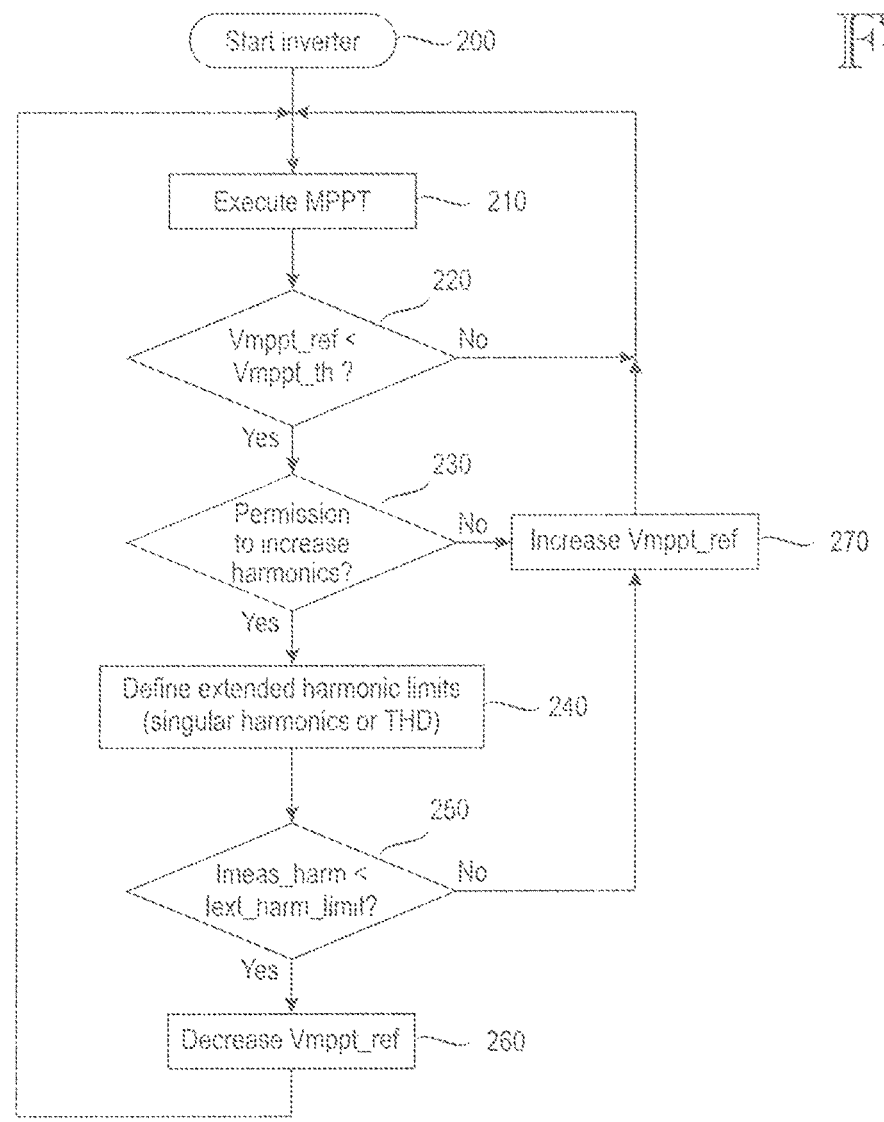
FIG. 2 illustrates a flowchart according to an embodiment.

FIG. 2 illustrates a flowchart according to an exemplary embodiment. First the inverter 10 is started in step 200. After starting, in step 210, the inverter 10 converts DC power supplied from the DC power source 20 to the DC input of the inverter 10 into AC power supplied from the AC output of the inverter to the AC network 30 by applying maximum power point tracking, MPPT, such that a harmonic content of an AC current supplied from the inverter 10 to the AC network 30 is kept within a predetermined maximum level. When operating within a verified (e.g. in type tests) MPPT voltage range, it might not be necessary to separately monitor the harmonic content. In step 220 it is checked, either continuously or periodically during the conversion 210, if a determined MPPT voltage reference, Vmppt_ref, of the inverter is less than a predetermined threshold value, Vmppt_th. If the determined MPPT voltage reference, Vmppt_ref, of the inverter is equal to or higher than the predetermined threshold value, Vmppt_th, then the conversion 210 continues without any changes. If the determined MPPT voltage reference, Vmppt_ref, of the inverter is less than the predetermined threshold value, Vmppt_th, then in step 230 it is checked, whether there is a permission to increase the harmonic content of the AC current beyond the predetermined maximum level. If an increase of the harmonic content of the AC current beyond the predetermined maximum level is not allowed, then in step 270 the MPPT voltage reference, Vmppt_ref, of the inverter is preferably increased at least to the predetermined threshold value Vmppt_th, and after that the conversion 210 continues with the increased MPPT voltage reference. If an increase of the harmonic content of the AC current beyond the predetermined maximum level is allowed, then in step 240 the predetermined maximum level of the harmonic content of the AC current used in the converting is increased by extending the corresponding limit or limits of the total harmonic distortion of the AC current and/or one or more individual harmonics of the AC current. After that, in step 250, it is possible to additionally check whether a measured harmonic content of the AC current, Imeas_harm, is less than the increased maximum level of the harmonic content of the AC current, Iext_harm_limit. If no, then then in step 270 the MPPT voltage reference, Vmppt_ref, of the inverter is preferably increased such that the resulting harmonic content of the AC current stays within the increased maximum level of the harmonic content of the AC current, and after that the conversion 210 continues with the increased MPPT voltage reference. If yes, then in step 260 the MPPT voltage reference, Vmppt_ref, of the inverter may be decreased. This may be implemented by lowering the predetermined threshold value, Vmppt_th, for the MPPT voltage reference to correspond to the increased maximum level of the harmonic content of the AC current. The lowering of the predetermined threshold value, Vmppt_th, for the MPPT voltage reference to correspond to the increased maximum level of the harmonic content of the AC current could alternatively be performed in connection with step 240. Finally, the conversion 210 may continue with the lowered MPPT voltage reference.

Figure 3:
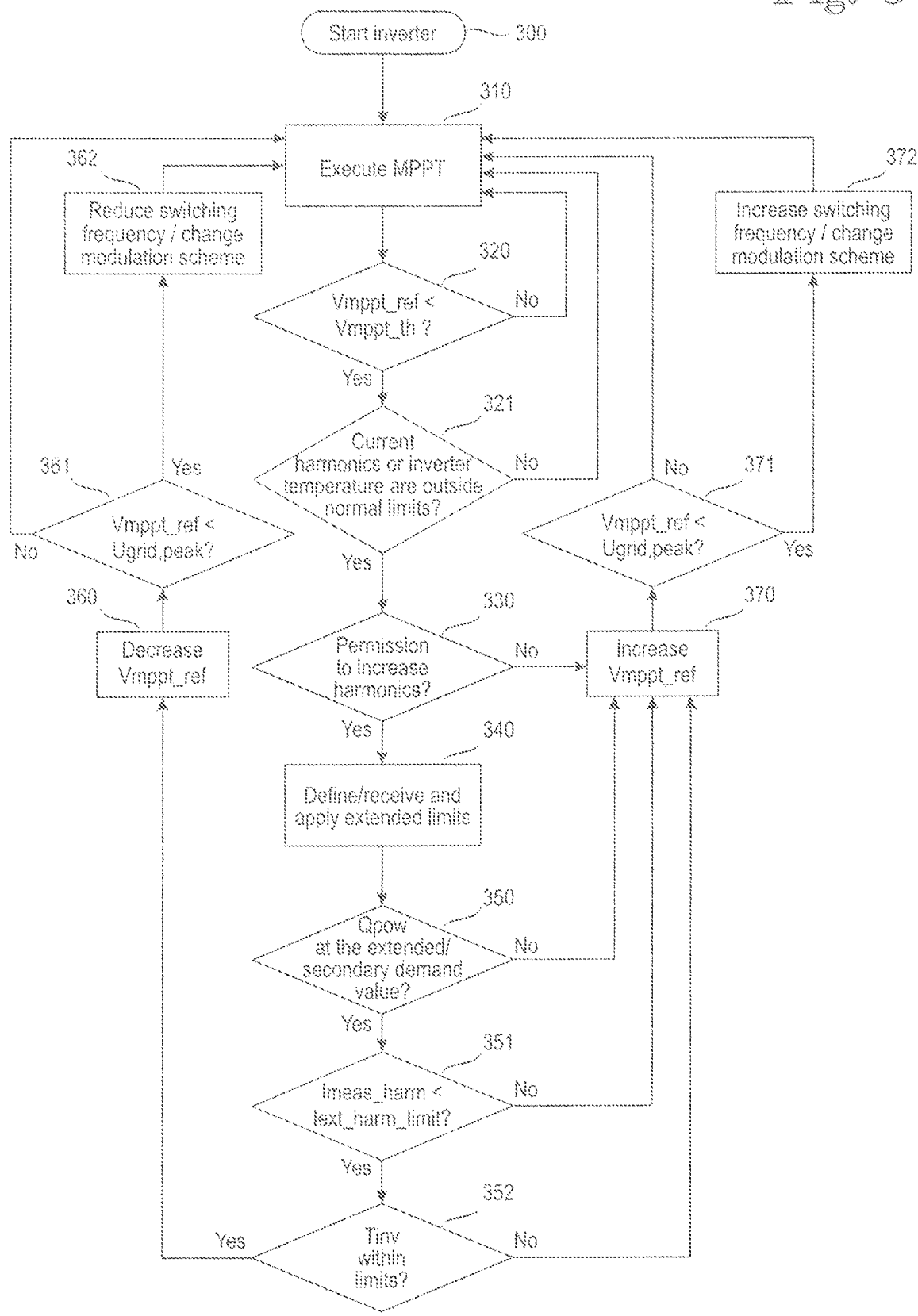
FIG. 3 illustrates a flowchart according to an embodiment.

FIG. 3 illustrates a flowchart according to an exemplary embodiment. First the inverter 10 is started in step 300. After starting, in step 310, the inverter 10 converts DC power supplied from the DC power source 20 to the DC input of the inverter 10 into AC power supplied from the AC output of the inverter to the AC network 30 by applying maximum power point tracking, MPPT, such that a harmonic content of an AC current supplied from the inverter 10 to the AC network 30 is kept within a predetermined maximum level. In step 320 it is checked, either continuously or periodically during the conversion 310, if a determined MPPT voltage reference, Vmppt_ref, of the inverter is less than a predetermined threshold value, Vmppt_th. If the determined MPPT voltage reference, Vmppt_ref, of the inverter is equal to or higher than the predetermined threshold value, Vmppt_th, then the conversion 310 continues without any changes. If the determined MPPT voltage reference, Vmppt_ref, of the inverter is less than the predetermined threshold value, Vmppt_th, then in step 321 it may further, or alternatively, be checked if the harmonic content of the AC current supplied from the inverter 10 to the AC network 30 is higher than a predetermined harmonic threshold level and/or if the temperature of the inverter 10 is higher than a predetermined temperature threshold level. If the harmonic content and/or the temperature of the inverter is equal to or lower than the corresponding predetermined threshold level, then the conversion 310 may continue without any changes. Otherwise, in step 330 it is checked, whether there is a permission to increase the harmonic content of the AC current beyond the predetermined maximum level. If an increase of the harmonic content of the AC current beyond the predetermined maximum level is not allowed, then in step 370 the MPPT voltage reference, Vmppt_ref, of the inverter is increased. Following step 370, it is possible to check in step 371 if the MPPT voltage reference is below a minimum DC voltage where pulse width modulation can be applied, Ugrid,peak. If not, then the conversion 310 may continue with the increased MPPT voltage reference. If yes, then in step 372 the switching frequency of the inverter 10 may be increased and/or a modulation scheme of the inverter 10 may be changed to a more suitable one. For example, the switching frequency of the inverter 10 may be increased in case of an over modulation situation. If an increase of the harmonic content of the AC current beyond the predetermined maximum level is allowed, then in step 340 the predetermined maximum level of the harmonic content of the AC current used in the converting is increased by extending the corresponding limit or limits of the total harmonic distortion of the AC current and/or one or more individual harmonics of the AC current. After that, in step 350, it is possible to additionally check if actual reactive power Qpow equals an extended/secondary reference value and, if not, then proceed to step 370. Otherwise, in step 351, it is possible to additionally check if the measured harmonic content of the AC current, Imeas_harm, is less than the increased maximum level of the harmonic content of the AC current, Iext_harm_limit. If not, then it is proceeded to step 370. Otherwise, in step 352, it is possible to additionally check if the inverter temperature Tiny is within allowable limits. If not, then it is proceeded to step 370. Otherwise in step 360 the MPPT voltage reference, Vmppt_ref, of the inverter may be decreased. This may be implemented by lowering the predetermined threshold value, Vmppt_th, for the MPPT voltage reference to correspond to the increased maximum level of the harmonic content of the AC current. Following step 360, it is possible to check in step 361 if the MPPT voltage reference is below a minimum DC voltage where pulse width modulation can be applied, Ugrid,peak. If not, then the conversion 310 may continue with the lowered MPPT voltage reference. If yes, then in step 362 the switching frequency of the inverter 10 may be reduced and/or a modulation scheme of the inverter 10 may be changed to a more suitable one. For example, an over modulation scheme allows injecting power to the AC network even if the DC voltage is below the peak value of the AC main voltage.

According to an embodiment, the idea to check if there is permission, e.g. from the AC network/utility owner to extended the limits for the harmonic content of the output AC current may be utilized e.g. in connection with the following situations:

1) A need/desire to maintain a desired reactive power injection level in low DC voltage situations. In the case that the maximum power point voltage of the PV generator falls to the minimum normally allowed level (minimum level where MPPT can work normally and allow PV inverter to inject reactive power to the grid) for the PV inverter being able to keep injecting a desired reactive power level to the grid and still perform MPPT, the only option is to reduce the quality of output current which allows the PV inverter to reduce the DC voltage level. This might be the case e.g. when the PV generator gets very hot or the DC voltage level produced by the PV panels degrades over time.

Production of the reactive power increasing the grid voltage requires higher DC voltage than pure active power production. Thus, the operation range is increased when higher harmonic content is allowed. The benefit is that at a low grid voltage condition requiring support from the power generating inverters is likely to occur under high power demand which in many cases occurs during high temperatures which in the case of PV systems means the lowest DC voltage condition. When the reactive power production is allowed at low voltages, also the active power production from the PV generator is maximized when the maximum power point voltage can be maintained during the reactive power generation. This can be combined to lower switching frequency or modified modulation so that the operation range is increased further.

2) A need/desire to extend the power (active or reactive) output of the inverter beyond nominal value. The inverter power level can be extended beyond the nominal values if there is a permission to reduce the quality of the output AC current of the inverter. This might be the case if the voltage or frequency of the AC network requires higher output values from the inverter in order to stay within the limits. This can be done by sacrificing the output current quality by reducing switching frequency or changing the modulation scheme, for example.

3) A need/desire to maximize the active power injection in low DC voltage conditions. Sometimes it might be desirable to maximize the active power production of the PV inverter in a low DC voltage condition by sacrificing the quality of output current and by reducing the reactive power value injected to the AC network. This can be achieved by utilizing the MPPT normally until the DC voltage lowers to the minimum DC voltage level and below that the inverter can be controlled based on inverter temperature and permitted extended limits, for example. According to the extended power control scheme the MPPT can be allowed to work as low as it is possible limited by the quality of output current, active power reference and/or the inverter temperature. Switching frequency can be lowered or the modulation scheme can be changed when DC voltage level approaches the level of rectified AC voltage.

The control arrangement 100, 101 or other means controlling the inverter according to any one of the embodiments herein, or a combination thereof, may be implemented as one physical unit or as two or more separate physical units that are configured to implement the functionality of the various embodiments. Herein the term 'unit' generally refers to a physical or logical entity, such as a physical device or a part thereof or a software routine. The control arrangement 100, 101 according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the invention, or a part thereof, may further comprise suitable input means for receiving e.g. measurement and/or control data, and output means for outputting e.g. control or other data. It is also possible to use a specific integrated circuit or circuits, or discrete electric components and devices for implementing the functionality according to any one of the embodiments.

The invention may be implemented in existing electric system components such as inverters. Present inverters may comprise processors and memory that may be utilized in the functions according to the various embodiments described herein. Thus, all modifications and configurations required for implementing an embodiment in existing electric system components, such as inverters may be performed as software routines, which may be implemented as added or updated software routines. If at least part of the functionality of the invention is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing the invention may be loaded to the unit or units executing the computer program code via a suitable data network, for example, and it may replace or update a possibly existing program code.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method for operating an inverter, the method comprising:

converting with the inverter DC power supplied from a DC power source to a DC input of the inverter into AC power supplied from an AC output of the inverter to an AC network by applying maximum power point tracking (MPPT) such that a harmonic content of an AC current supplied from the inverter to the AC network is kept within a predetermined maximum level, wherein during the converting:

a) detecting a need to increase the harmonic content of the AC current supplied from the inverter to the AC network beyond the predetermined maximum level, wherein the need to increase the harmonic content of the AC current is detected in response to a determined MPPT voltage reference of the inverter being less than a predetermined voltage threshold value;

b) performing, in response to detecting the need to increase the harmonic content of the AC current beyond the predetermined maximum level, a check whether the increase of the harmonic content of the AC current beyond the predetermined maximum level is allowed; and c) if the increase of the harmonic content of the AC current beyond the predetermined maximum level is allowed, raising the predetermined maximum level used in the converting.

2. The method of claim 1, wherein the harmonic content of the AC current supplied from the inverter to the AC network is determined on the basis of total harmonic distortion of the AC current or one or more individual harmonics of the AC current.

3. The method of claim 1, wherein the need to increase the harmonic content of the AC current is detected in response to one or more of the following: the harmonic content of the AC current supplied from the inverter to the AC network being higher than a predetermined harmonic threshold level, a temperature of the inverter being higher than a predetermined temperature threshold level, receiving in the inverter a request or an allowance to increase the harmonic content of the AC current.

4. The method of claim 1, wherein the check whether the increase of the harmonic content of the AC current beyond the predetermined maximum level is allowed is performed by checking a value of one or more parameters stored in a memory in the inverter or in a memory connected to the inverter, or by checking a value of one or more signals received by the inverter.

5. The method of claim 4, wherein said one or more signals are received in response to a query sent from the inverter.

6. The method of claim 1, wherein, in step c), if the increase of the harmonic content of the AC current beyond the predetermined maximum level is allowed, the predetermined maximum level used in the converting is raised to a predetermined level or to a level determined or obtained during or after the check performed in step b).

7. The method of claim 1, wherein the DC power source comprises one or more photovoltaic panels.

8. A system comprising:

an inverter;

a non-transitory computer readable medium structured to store instructions corresponding to the steps of the method according to claim 1; and a microprocessor-based device in operative communication with the inverter and the non-transitory computer readable medium, and configured to execute the instructions stored with the non-transitory computer readable medium.

9. An inverter arrangement comprising:

an inverter with a DC input and an AC output; and a control arrangement configured to:

control the inverter to convert DC power supplied from a DC power source to the DC input of the inverter into AC power supplied from the AC output of the inverter to an AC network by applying maximum power point tracking (MPPT) such that a harmonic content of an AC current supplied from the inverter to the AC network is kept within a predetermined maximum level, wherein during the converting the control arrangement is configured to:

detect a need to increase the harmonic content of the AC current supplied from the inverter to the AC network beyond the predetermined maximum level, wherein the control arrangement is configured to detect the need to increase the harmonic content of the AC current in response to a determined MPPT voltage reference of the inverter being less than a predetermined voltage threshold value;

perform, in response to detecting the need to increase the harmonic content of the AC current beyond the predetermined maximum level, a check whether the increase of the harmonic content of the AC current beyond the predetermined maximum level is allowed; and if the increase of the harmonic content of the AC current beyond the predetermined maximum level is allowed, raise the predetermined maximum level used in the converting.

10. The inverter arrangement of claim 9, wherein the control arrangement is configured to determine the harmonic content of the AC current supplied from the inverter to the AC network on the basis of total harmonic distortion of the AC current or one or more individual harmonics of the AC current.

11. The inverter arrangement of claim 9, wherein the control arrangement is configured to detect the need to increase the harmonic content of the AC current in response to one or more of the following: the harmonic content of the AC current supplied from the inverter to the AC network being higher than a predetermined harmonic threshold level, a temperature of the inverter being higher than a predetermined temperature threshold level, receiving in the inverter a request or an allowance to increase the harmonic content of the AC current.

12. The inverter arrangement of claim 9, wherein the control arrangement is configured to perform the check whether the increase of the harmonic content of the AC current beyond the predetermined maximum level is allowed by checking a value of one or more parameters stored in a memory in the inverter or in a memory connected to the inverter, or by checking a value of one or more signals received by the inverter.

13. The inverter arrangement of claim 12, wherein said one or more signals are received in response to a query sent by the control arrangement.

14. The inverter arrangement of claim 9, wherein if the increase of the harmonic content of the AC current beyond the predetermined maximum level is allowed, the control arrangement is configured to raise the predetermined maximum level used in the converting to a predetermined level or to a level determined or obtained during or after the check whether the increase of the harmonic content of the AC current beyond the predetermined maximum level is allowed.

15. An inverter comprising:
   a DC input and an AC output, and
   being configured to convert DC power supplied from a DC power source to the DC input of the inverter into AC power supplied from the AC output of the inverter to an AC network by applying maximum power point tracking (MPPT) such that a harmonic content of an AC current supplied from the inverter to the AC network is kept within a predetermined maximum level, wherein during the converting the inverter is configured to:
   detect a need to increase the harmonic content of the AC current supplied from the inverter to the AC network beyond the predetermined maximum level, wherein the inverter is configured to detect the need to increase the harmonic content of the AC current in response to a determined MPPT voltage reference of the inverter being less than a predetermined voltage threshold value;
   perform, in response to detecting the need to increase the harmonic content of the AC current beyond the predetermined maximum level, a check whether the increase of the harmonic content of the AC current beyond the predetermined maximum level is allowed; and
   if the increase of the harmonic content of the AC current beyond the predetermined maximum level is allowed, raise the predetermined maximum level used in the converting.

16. An electric system comprising:
   a DC power source comprising one or more photovoltaic panels;
   an inverter with a DC input and an AC output; and
   a control arrangement configured to:
   control the inverter to convert DC power supplied from the DC power source to the DC input of the inverter into AC power supplied from the AC output of the inverter to an AC network by applying maximum power point tracking (MPPT) such that a harmonic content of an AC current supplied from the inverter to the AC network is kept within a predetermined maximum level, wherein during the converting the control arrangement is configured to:
   detect a need to increase the harmonic content of the AC current supplied from the inverter to the AC network beyond the predetermined maximum level, wherein the control arrangement is configured to detect the need to increase the harmonic content of the AC current in response to a determined MPPT voltage reference of the inverter being less than a predetermined voltage threshold value;
   perform, in response to detecting the need to increase the harmonic content of the AC current beyond the predetermined maximum level, a check whether the increase of the harmonic content of the AC current beyond the predetermined maximum level is allowed; and
   if the increase of the harmonic content of the AC current beyond the predetermined maximum level is allowed, raise the predetermined maximum level used in the converting.

* * * * *